(12) United States Patent
Lutzka

(10) Patent No.: US 9,573,499 B2
(45) Date of Patent: Feb. 21, 2017

(54) HEADREST DUMP ASSEMBLY INTEGRATED INTO A SEATBACK

(71) Applicant: BAE Industries, Inc., Warren, MI (US)

(72) Inventor: Tavis Lutzka, Davisburg, MI (US)

(73) Assignee: BAE Industries, Inc., Auburn Hills, MI (US)

( * ) Notice: Subject to any disclaimer, the term of this patent is extended or adjusted under 35 U.S.C. 154(b) by 41 days.

(21) Appl. No.: 14/661,070

(22) Filed: Mar. 18, 2015

(65) Prior Publication Data

US 2015/0266402 A1 Sep. 24, 2015

Related U.S. Application Data

(60) Provisional application No. 61/954,946, filed on Mar. 18, 2014.

(51) Int. Cl.
| | |
|---|---|
| *A47C 1/00* | (2006.01) |
| *A47C 7/36* | (2006.01) |
| *A61G 15/00* | (2006.01) |
| *B60R 22/28* | (2006.01) |
| *B60N 2/48* | (2006.01) |
| *B60N 2/30* | (2006.01) |
| *B60N 2/42* | (2006.01) |
| *B60N 2/44* | (2006.01) |
| *B60N 2/005* | (2006.01) |

(52) U.S. Cl.
CPC .......... *B60N 2/4855* (2013.01); *B60N 2/3009* (2013.01); *B60N 2/43* (2013.01); *B60N 2/4802* (2013.01); *B60N 2/4805* (2013.01); *B60N 2/485* (2013.01); *B60N 2/4823* (2013.01); *B60N 2/4838* (2013.01); *B60N 2/4841* (2013.01); *B60N 2/4885* (2013.01); *B60N 2002/0055* (2013.01); *B60N 2002/445* (2013.01)

(58) Field of Classification Search
CPC ....... B60N 2/4805; B60N 2/43; B60N 2/4885; B60N 2/4802; B60N 2/4841; B60N 2/4823; B60N 2/4838; B60N 2/485; B60N 2/4855
USPC .............................. 297/408, 391, 400, 216.12
See application file for complete search history.

(56) References Cited

U.S. PATENT DOCUMENTS

| | | | |
|---|---|---|---|
| 6,935,696 B2 * | 8/2005 | Gauthier ................. | A47C 7/38 297/391 |
| 7,341,312 B2 * | 3/2008 | Gauthier ................. | A47C 7/38 297/408 |
| 7,422,280 B2 | 9/2008 | Brockman | |

(Continued)

*Primary Examiner* — Chi Q Nguyen
(74) *Attorney, Agent, or Firm* — Dinsmore & Shohl LLP; Douglas Mcevoy

(57) ABSTRACT

A headrest assembly having a bracket mount affixed to an upper portion of a seatback frame and at least one headrest bun supporting tube pivotally secured to the bracket mount. A spring biased cam is pivotally secured to the bracket mount and, in a normally biased position, engages an underside projection of a selected one of the supporting tubes, the cam also having an outwardly projecting pin. At least one wheel shaped component is rotatably mounted to an exterior of the bracket mount in proximity to the cam, the wheel having an outer circumferential location which, upon being rotated, contacts the projecting pin causing the cam to pivot in a downward unseating direction from the supporting tube, triggering release of the headrest and supporting tubes in a forwardly rotating and dump position.

20 Claims, 13 Drawing Sheets

(56) References Cited

U.S. PATENT DOCUMENTS

| | | | |
|---|---|---|---|
| 7,984,951 B2* | 7/2011 | Sayama | B60N 2/4855 |
| | | | 297/408 |
| 8,000,356 B2 | 8/2011 | Laarhuis et al. | |
| 8,511,751 B2 | 8/2013 | Bruck | |
| 9,050,917 B2* | 6/2015 | Tobata | B60N 2/4841 |
| 9,290,115 B2* | 3/2016 | Lutzka | B60N 2/3065 |
| 2005/0067874 A1 | 3/2005 | Kamrath et al. | |
| 2008/0036263 A1* | 2/2008 | Little | B60N 2/4855 |
| | | | 297/409 |
| 2008/0100118 A1 | 5/2008 | Young et al. | |
| 2009/0184555 A1 | 7/2009 | Yetukuri et al. | |
| 2010/0117432 A1 | 5/2010 | Lutzka et al. | |
| 2011/0148170 A1* | 6/2011 | Grable | B60N 2/4858 |
| | | | 297/408 |
| 2011/0175421 A1* | 7/2011 | Grable | B60N 2/4847 |
| | | | 297/408 |

* cited by examiner

HEADREST DUMP ASSEMBLY INTEGRATED INTO A SEATBACK

CROSS-REFERENCE TO RELATED APPLICATIONS

This Application claims the benefit of U.S. Provisional Application 61/954,946 filed on Mar. 18, 2014, the contents of which is incorporated herein in its entirety.

FIELD OF THE INVENTION

The present invention discloses a headrest dump assembly integrated into an upper portion of a seatback frame and which includes both cable and pull strap actuating variants for separately triggering release of the headrest bun supporting tubes. A spring biased cam is pivotally secured to a side bracket mount location and, in a normally biased position, engages an underside location of a width extending bracket sector associated with a pair of pivotally associated headrest bun supporting tubes.

In a first release protocol, forward rotation of the seatback causes progressive displacement of a cable looped around a first wheel rotatably supported upon an exterior surface of the side bracket, such that its perimeter edge is rotated into downwardly pivotally displacing contact with an outwardly projecting pin associated with the cam. Downward counter-biased pivoting of the cam causes it to unseat from the width extending bracket sector and supported headrest tubes, resulting in spring biased dumping of the headrest (such as in a timed fashion relative to an intermediate pivoted position of the seatback prior to it folding forwardly).

In a second release protocol, a secondary wheel is coaxially supported in independently rotating fashion against an exterior surface of the cable supported first wheel and, upon localized displacement of a pull strap extending from an offset location of the secondary wheel, results in a similar perimeter edge portion configured on the secondary wheel rotating into abutting and downwardly pivoting contact with the cam pin, to again cause unseating from the headrest tubes. In either protocol, the headrest tubes and bun are manually rotated in a reverse, counter-biasing and upright design direction, following which the underside profile associated with the width extending headrest bracket sector clears the cam, allowing its spring bias to upwardly displace its engaging forward profile back into contact with the underside engaging location of the width extending bracket of the pivoting headrest.

BACKGROUND OF THE INVENTION

The prior art is well documented with headrest dump and rewind assemblies. A first example of this is the pivoting headrest design of U.S. Pat. No. 8,511,751, to Bruck, which discloses a pair of upwardly projecting supports associated with a vehicle seatback and terminating in a pair of spaced apart sectors. A headrest bun supporting frame is pivotally secured to the sectors and includes a pair of elongated and side extending structural supports and a lower interconnecting housing. A widthwise extending bar is disposed relative to the housing, opposite extending ends of which engage the sectors at a first upright position and seat within channels in the side supports. The bar is biased in a first engaging direction against the sectors and, upon being displaced in a reverse direction, causes its ends to unseat from the sectors and the bun to rotate about the sectors to a dump position.

US 2009/0184555, to Yetukuri, discloses a head restraint actuation system including a head restraint positionable in an upright and folded position. Repositioning of the head restraint is accomplished through the action of a head restraint actuator. The head restraint actuator is in communication with the head restraint. An actuating cable system includes a cable that is in communication with the head restraint actuator and a user operated handle. User initiated movement of the handle causes movement of the cable thereby causing the head restraint to be positioned in the folded position. The activation system is able to simultaneously actuate a plurality of head restraints.

U.S. Pat. No. 7,422,280, to Brockman, teaches a foldable headrest assembly for a seat including a pair of posts engaged with an upper portion of the seat and a frame rotatably supported by the posts. A latch is moveably supported by the frame and includes a release pin. A release mechanism is coupled to the latch for moving the latch from a locked position preventing rotation of the frame relative to the posts to an unlocked position allowing rotation of the frame relative to the posts. The assembly further includes an inertia lock rotatably coupled to the frame. The inertia lock defines a stop slot corresponding to the release pin. In response to deceleration of the frame, e.g., resulting from a collision of the vehicle, the inertia lock rotates to a triggered position whereby the stop slot receives the release pin and limits movement of the release pin thereby maintaining the latch in the locked position.

US 2005/0067874, to Kamrath, teaches a headrest attached to a seatback automatically pivotal to a stowed position as the seatback is folded forward and so that the seatback may lay flat when folded. When the seatback is returned to the upright position, the headrest returns to its original extended position.

US 2010/0117432, to Lutzka, teaches a pivoting headrest assembly including a bracket supported upon a seatback frame. A headrest support secures a bun and is pivotally secured to the bracket in a forward biased direction. A rotating sector is supported upon the bracket and is pivotally slaved to the headrest support. A cam is pivotally supported upon the bracket and biased in a first direction to abut the sector in an upright design position established by the headrest support. A contact portion extends from a location of the cam offset from its pivotal connection to the bracket. A lever is independently rotated and coaxially supported relative to the rotating sector in a first biased direction. The lever is actuated against the bias to engage the contact portion, with continued actuation causing the cam to pivotally disengage from the rotating sector, whereupon the headrest support and bun pivotally actuates to a forward dump position.

Finally, US 2008/0100118, to Young, teaches a dynamic headrest having the capability to move forwardly during an accident or other suitable condition so as to limit injuries to an occupant's head. The headrest optionally includes an actuator configured to move the headrest forwardly in response to rotary motion of a rotary member.

SUMMARY OF THE INVENTION

The present invention discloses a headrest assembly having a bracket mount affixed to an upper portion of a seatback frame and at least one headrest bun supporting tube pivotally secured to the bracket mount. A spring biased cam is pivotally secured to the bracket mount and, in a normally biased position, engages an underside projection of a selected one of the supporting tubes, the cam also having an outwardly projecting pin.

At least one wheel shaped component is rotatably mounted to an exterior of the bracket mount in proximity to the cam, the wheel having an outer circumferential location which, upon being rotated, contacts the projecting pin causing the cam to pivot in a downward unseating direction from the supporting tube, triggering release of the headrest and supporting tubes in a forwardly rotating and dump position.

The bracket mount further exhibits a multi-sided construction including a substantially planar surface, a bottom flange and a pair of side flanges. A thin strip shaped and width extending plate seats against underside ledge surfaces of the side flanges and so that the bracket mount is affixed to a generally central location of a seatback upper cross extending frame member, with the plate overlaying a top surface of the cross member and the bottom flange overlapping a bottom surface of the cross member, a pair of fasteners engaging through the bottom flange, cross member and top surface.

Other features include a bracket sector mounted to a bottom end location of each of the headrest bun supporting tubes, each of the bracket sectors exhibiting a pseudo planar and curved profile for capturing the bottom inserting ends of the headrest tubes. A main pivot pin seats through apertures in the bracket sectors in alignment with apertures formed through the side flanges of the bracket mount. A main pivot torsion spring extends between the bracket sectors and through a widthwise interior of which is seated the main pivot pin. A first end of the spring engages an underside edge of a selected one of the pivotally supported bracket sectors, an opposite second end of the main spring biases against a supporting location of the bracket mount.

Additional features include the spring biased cam further having a lower end defined aperture, through which is inserted from an inside direction a cam pivot pin. The cam aligns against an inside surface of a selected one of the side flanges of the bracket mount and so that the pivot pin inserts through the cam aperture and an aligning aperture in the selected side flange. The cam further includes an outwardly projecting pin extending from an intermediate location thereof and through an arcuate channel defined in the selected side flange in order to define a pivotal range of cam displacement.

A cam torsion spring seats over an inner projecting portion of the cam pivot pin and includes an outer angled end which biases against an underside location of the cam. An opposite inner spring end of the cam torsion spring is curled inwardly in order to seat within a diameter extending recessed surface established within the inner end of the pivot pin. In this manner, the cam torsion spring influences the cam in an upwardly biased fashion such that a forward contoured edge of the cam abuts an inside location defined along an underside projecting portion of the selected bracket sector.

Other features include the at least one wheel shaped component further defining a pair of independently rotatable and coaxially supported wheel shaped components provided upon an exterior surface of the selected side flange, each of the first and second independently rotatable wheels having a central aperture which mounts a pin, in turn seating through a further aperture defined in the selected side flange of the bracket mount. Each of the wheels further has a an outer circumferential profile exhibiting a protrusion, the outwardly projecting pin portion of the cam extends an adequate distance through the arcuate channel defined in the selected side flange such that it can be alternatively engaged and downwardly pivoted by either of the circumferential located protrusions.

A first of the pair of wheel shaped components further includes a cable actuated wheel having an outer circumferential extending recess defined therein, a cable release torsion spring and associated cable bracket being secured to an exterior surface of the selected side flange and engaged by the wheel mounting pin extending through an aligning aperture defined in the cable bracket. A cable mount is affixed to a location of the cable bracket, an outer sheath of the cable extending from the cable mount to a remote location of the seatback. An inner translating wire projects from the fixed cable mount and is looped about and secured to the circumferential recess defined in the first wheel such that rotation of the headrest is triggered in response to forward rotating motion of the seatback about a lower pivot location.

Other features include a further torsional spring applied against an exterior surface of a second of the wheel shaped components, an inner curled end of the further torsional spring securing over a notched outer end of the wheel mounting pin. An opposite outer extending end of the further torsional spring abutting against a projecting end location of the stem associated with the pin, biasing the second wheel in a selected rotational direction.

A pull strap is secured between a pair of spaced apart projections forming a portion of a housing associated with the second wheel. A pin seats through end proximate and aligning apertures in the projections, as well as passing through the inner looped end of the strap in order to secure the strap to a rotationally offset location of the second wheel relative to a central coaxial axis defined by wheel mounting pin.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
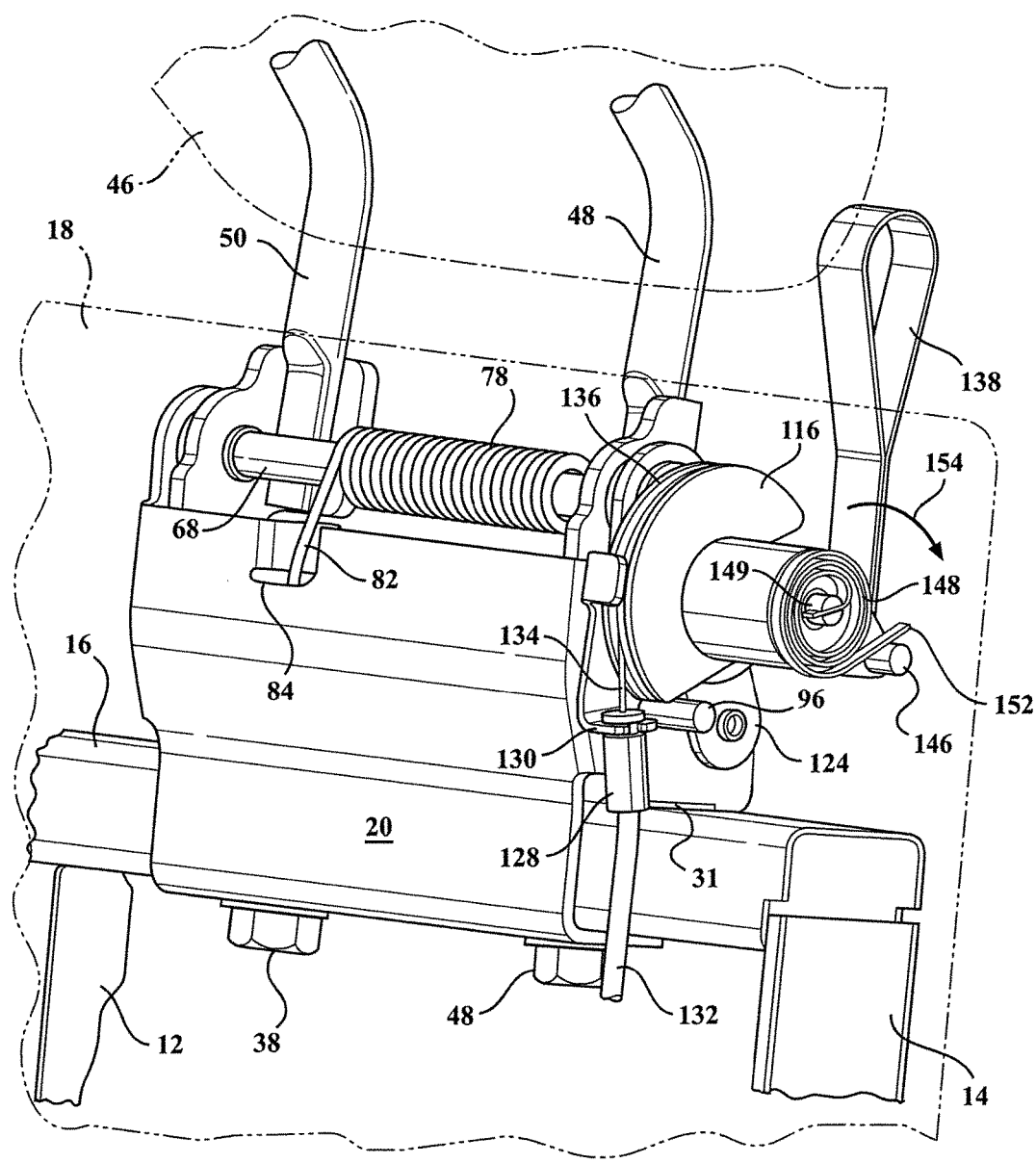
FIG. 1 is a frontal perspective of the in-seat back supported headrest assembly, illustrating the surrounding seatback cushion in substantially see through fashion, and depicting the headrest support tubes in an upright engaged and design position.
Figure 2:
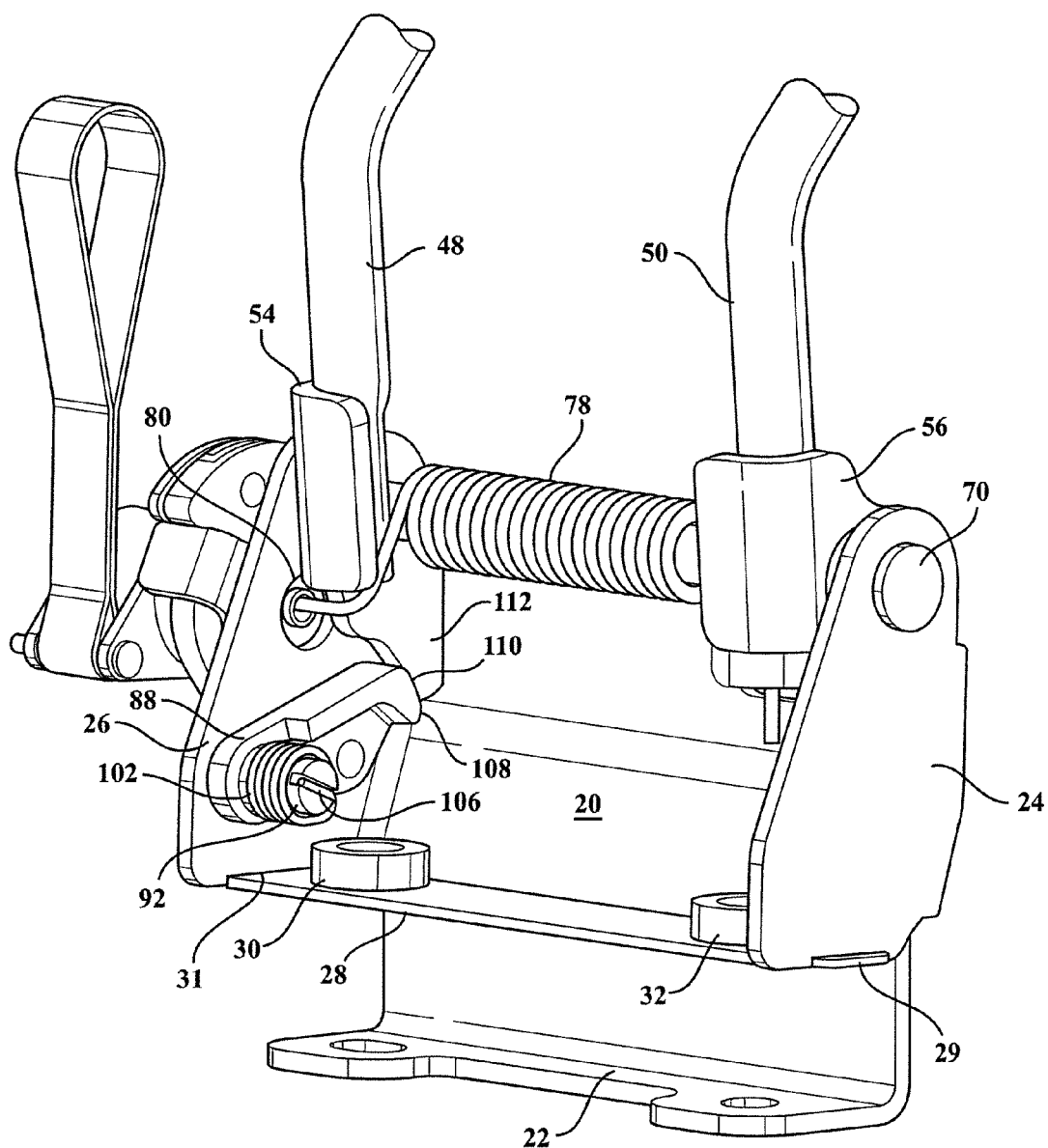
FIG. 2 is a rotated rear perspective of the headrest shown in FIG. 1 and better showing the engagement profile established between the upwardly biased cam supported on an inner side extending surface of the bracket mount and the underside end projection associated with the width extending headrest bracket sector.
Figure 3:
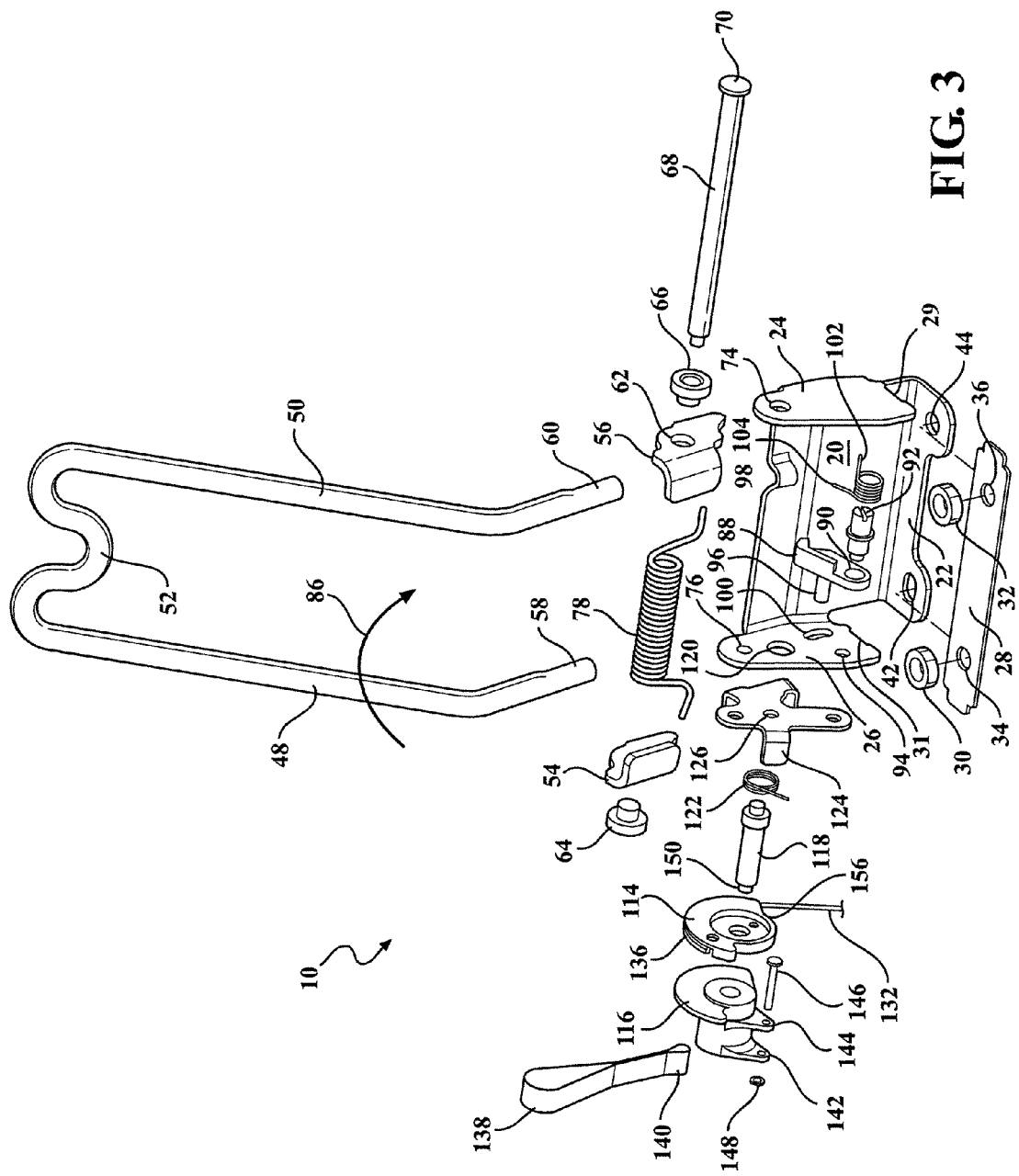
FIG. 3 is an exploded perspective of the headrest dump assembly.

Referring to FIGS. 1-13, a series of illustrations are provided, see generally at 10 in FIG. 3, of a headrest dump assembly integrated into an upper portion of a seatback frame, further referenced by side frame members 12 and 14 and upper cross extending member 16 (see FIG. 1). As further shown through the drawings, the seatback cushion (depicted in phantom at 18 again in FIG. 1) is depicted in substantially see through or transparent fashion in order to provide visualization as to the positioning and dimensioning of the headrest assembly.

As further best shown when viewing FIGS. 1-3 collectively, a bracket mount associated with the headrest assembly includes a multi-sided construction, such as composed of a grade steel along with a similar material employed in the construction of the other components. The bracket mount includes a vertically extending and substantially planar surface 20, an integrally configured or likewise connected bottom flange 22 and a pair of side flanges 24 and 26. As shown in FIG. 2, a thin strip shaped and width extending plate 28 seats against underside ledge surfaces 29 and 31 of side flanges 24 and 26 and so that the bracket mount is affixed to a generally central location of the seatback upper cross extending member 16 (see again FIG. 1), and further so that the plate 28 overlays a top surface of the rectangular frame profile, with the bottom flange 22 overlapping an opposite bottom surface of the profile of the cross extending member 16.

A pair of weld nuts 30 and 32 are affixed over aligning apertures 34 and 36 (FIG. 3) defined in the strip shaped plate 28. A pair of heavy duty mounting bolts (see enlarged heads at 38 and 40 in FIG. 1) mount through apertures 42 and 44 (again FIG. 3) defined in the bottom flange 22 from an underside of the cross extending frame member 16, with their upper stems seating through the top surface of the cross member 16 (typically through aligning apertures defined through the member 16 which are not shown for ease of representation) and engaged through the apertures 34 and 36 of the strip shaped plate 28 and associated top surface affixed weld nuts 30 and 32 (such further exhibiting inner threaded spirals which rotationally inter-engage mating exterior threads defined upon the bolts 38 and 40.

A headrest bun is depicted in substantially transparent fashion at 46 in FIG. 1. The bun 46 is supported upon a pair of headrest tubes 48 and 50, these in turn being interconnected such at an upper end by a width extending and undulating section 52, and about which the bun is secured. As further shown, the tubes 48 and 50 can exhibit a reverse bent or any other suitable profile for dimensioning and orienting the headrest bun 46 above the top surface of seatback cushion 18. The pivoting component of the headrest assembly can be reconfigured to any shape, such as in which the pair of headrest tubes illustrated can be redesigned as a single tube, a flattened extending strip, or the like. As such, the definition of a headrest tube for the purposes of the present description can contemplate any structure capable of orienting and supporting the headrest bun at an elevated location above the seatback.

A pair of right 54 and left 56 bracket sectors are shown (again best illustrated in FIG. 3) and each exhibit a pseudo planar and curved profile for capturing bottom inserting ends 58 and 60 of the headrest tubes 48 and 50. The bracket sectors 54 and 56 each include an aperture (see at 62 for selected bracket 56) through which are exteriorly seated a pair of main pivot spacers (or bushings) 64 and 66. A main pivot pin 68 exhibiting an outer enlarged head 70 is seated through the bracket sectors 54 and 56, upon these and their associated spacers 64 and 66 being positioned against inside faces of the side flanges 24 and 26 at locations proximate to top edges of the flanges and in alignment with apertures 74 and 76 (FIG. 3) formed through the flanges 22 and 24.

A main pivot torsion spring 78 is provided in width extending fashion between the bracket sectors 54 and 56 and through a widthwise interior of which is seated the main pivot pin 68. In this fashion, the sectors 54 and 56, pin 68 and collar spacers 64 and 66 collectively define a width extending sector bracket which is pivotally supported relative to the seatback affixed vertically extending surface 20, and in turn supports the pair of extending headrest bun supporting tubes 48 and 50. The spring 78 includes a first end 80 (FIG. 2) which engages an underside edge of the selected and pivotally supported bracket sector 54, an opposite second end 82 (FIG. 1) biasing against an aperture defined surface 84 defined at an upper end proximate interior location of the vertically extending surface 20 of the bracket mount. In this manner, the headrest assembly is biased in a rotational direction referenced by arrow 86 in FIG. 3.

A spring biased cam 88 is provided and, as best shown in FIG. 3, includes a lower end with an aperture 90, through which is inserted from an inside direction a cam pivot pin 92.

The aperture 90 in the cam 88 aligns against an inside surface of the selected side flange 26 and so that the pivot pin 92 inserts through the cam aperture 90 and an aligning aperture 94 in the side flange 26. The cam 88 further includes an outwardly projecting pin 96 extending from an intermediate location thereof in order to define a pivotal range of cam displacement (arrow 98) as established by an arcuately and vertically extending channel 100 defined in the side flange 26 and through which the pin 96 seats so that an outer most portion projects from the outside surface of the side flange 26.

A cam torsion spring 102 seats over the inner projecting portion of the pivot pin 92 and includes an outer angled end 104 which biases against an underside location of the cam 88, an opposite inner spring end 106 (FIG. 2) being curled inwardly in order to seat within a diameter extending recessed surface established within the inner end of the pivot pin 92. In this fashion, and as again best shown in FIG. 2, the cam torsion spring 102 influences the cam 88 in an upwardly biased fashion and further such that a forward contoured edge 108 (again as best shown in FIG. 2) of the cam abuts an inside location, further at 110, of an underside projecting portion 112 of the selected bracket sector 54.

A pair of independently rotatable and coaxially supported components are provided upon an exterior surface of the selected side flange 26. In one non-limiting embodiment, the rotatable components can each exhibit a substantially wheel shape, such as including a first cable actuated wheel 114 and a second strap actuated wheel 116. Each of the first 114 and second 116 independently rotatable wheels includes a central aperture through which is mounted a pin 118, this in turn seating through a further aperture 120 in the side flange 126 (again FIG. 3). A cable release torsion spring 122 and associated cable bracket 124 are provided and likewise secure to an exterior surface of the side flange 26, and can be further engaged by the pin 118 extending through an aligning aperture 126 defined in the cable bracket 124.

As further best shown in FIG. 1, a cable mount 128 is affixed to a location 130 of the cable bracket 124. An outer sheath 132 extends from the cable mount 128, with an inner translating wire depicted at a first projecting end 134 from the fixed cable mount 128 and both looped about and secured to a circumferential recess 136 defined in the first wheel 114. As will be further explained, an opposite end of the inner translating wire (not shown) is secured to a remote location of the seatback and, in response to forward rotating motion of the seatback about a lower pivot location (also not shown), the length and positioning of the cable is configured to time a desired triggering of the forward rotation of the headrest to the dump position, typically at an intermediate pivoting location of the seatback and so that the headrest is not obstructed by a forward located seat upon rotation to the stowed position.

A pull strap 138 is shown in relation to the second wheel 116 and includes an outer looped (grasping) end and an inner looped end 140 which is positioned between a pair of spaced projections 142 and 144 (FIG. 3), these further defining a portion of a supporting housing associated with the second and independently rotatable wheel 116. A pin 146 seats through end proximate and aligning apertures in the projections as well as passing through the inner looped end 140 of the strap 138 in order to secure the strap to a rotationally offset location of the second wheel 116 relative to the central coaxial axis defined by the pin 118.

Also shown at 148 (see also FIG. 1) is a further torsional spring in contact with an exterior end of said second wheel 116, the spring 148 having an inner curled end 149 (FIG. 1) which secures over a notched outer projecting end (at 150 in FIG. 3) of the wheel mounting pin 118, with an opposite outer extending end 152 (again FIG. 1) of the spring 148 abutting against a projecting end location of the stem associated with the pin 146, thus biasing the second wheel 116 in a clockwise direction (see arrow 154 in FIG. 1). As will be further explained, the first cable wheel 114 does not require a spring bias, as its rotational motion is guided by the inner displacing wire 134 of the cable 132 and is dependent upon the pivoting location of the seatback.

Additional features include each of the first cable wheel 114 and second handle or strap actuated wheel 116 exhibiting an outer circumferential profile, each of these further exhibiting a circumferentially located ledge or protrusion (see at 156 for inner cable wheel 114 and further at 158 for outer coaxially supported strap actuated wheel 116). As will be further now explained with reference to the successive illustrations, the outwardly projecting pin portion 96 of the spring loaded cam 88 extends an adequate distance through the channel 100 defined in the side flange 26 such that it can be alternatively engaged and downwardly pivoted by either of the circumferential located protrusions 156 and 158 of the wheels 114 or 116, respectively, upon actuating rotation according to a selected protocol.

Specifically, and in a first release protocol, forward rotation of the seatback causes progressive displacement of the cable inner wire 134 looped around the outer circumference of the first wheel 114, such that its perimeter edge location 156 is rotated into downwardly pivotally displacing contact with the outwardly projecting pin 96 associated with the cam 88. Downward counter-biased pivoting of the cam 88 (see again arrow 98 in FIG. 3 and as downwardly displaced in FIG. 4) causes outer abutting edge location 108 to unseat from the opposing and supporting inside location 110 of the projecting underside portion 112 of the selected bracket sector 54, this forming a portion of the width extending bracket sector and supported headrest tubes, thus resulting in spring biased dumping of the headrest (such as again in a timed fashion relative to an intermediate pivoted position of the seatback prior to it folding forwardly).

Figure 4:
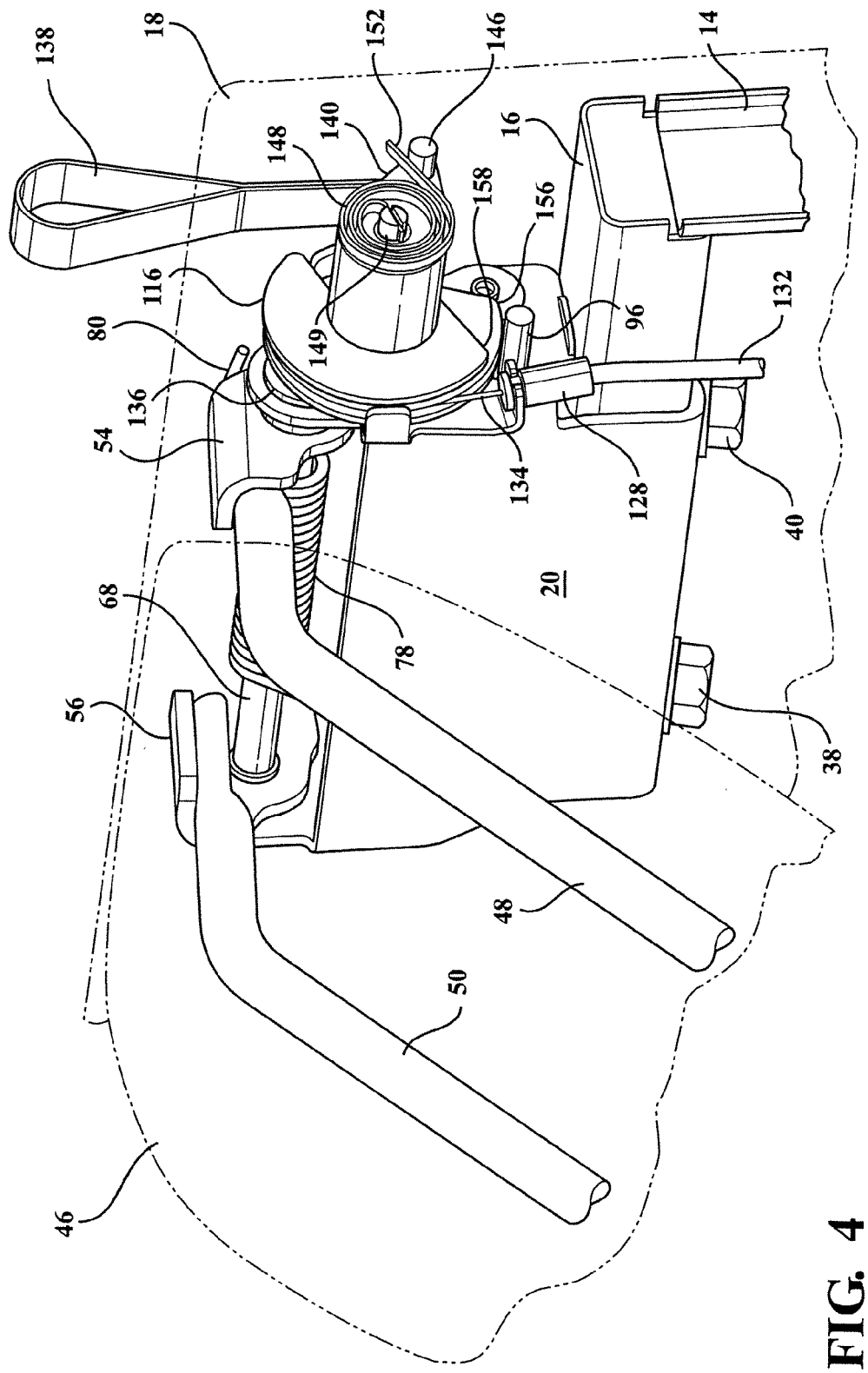
FIG. 4 is a succeeding illustration to FIG. 2 and showing the headrest bun support tubes and width supporting bracket in an intermediate forwardly rotated position upon downward pivoting release of said cam from said underside engaging projection, such resulting in a first actuating protocol in response to forward dumping motion of the seatback which causes a cable to rotate the perimeter edge of the first wheel into contact with the outwardly projecting cam pin.
Figure 5:
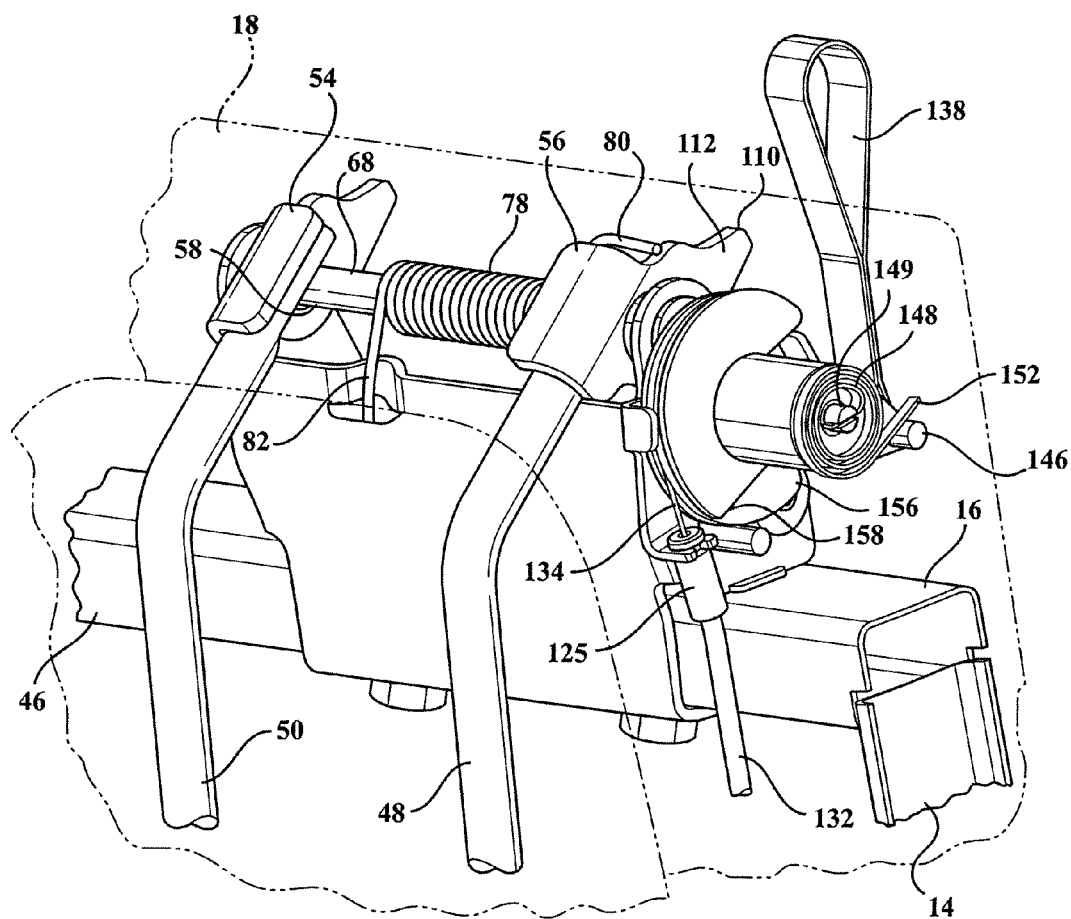
FIG. 5 is a further succeeding view of FIG. 4 depicting the headrest in a fully forward rotated and dumped position at an intermediate position established by the forward pivoting seatback.
Figure 6:
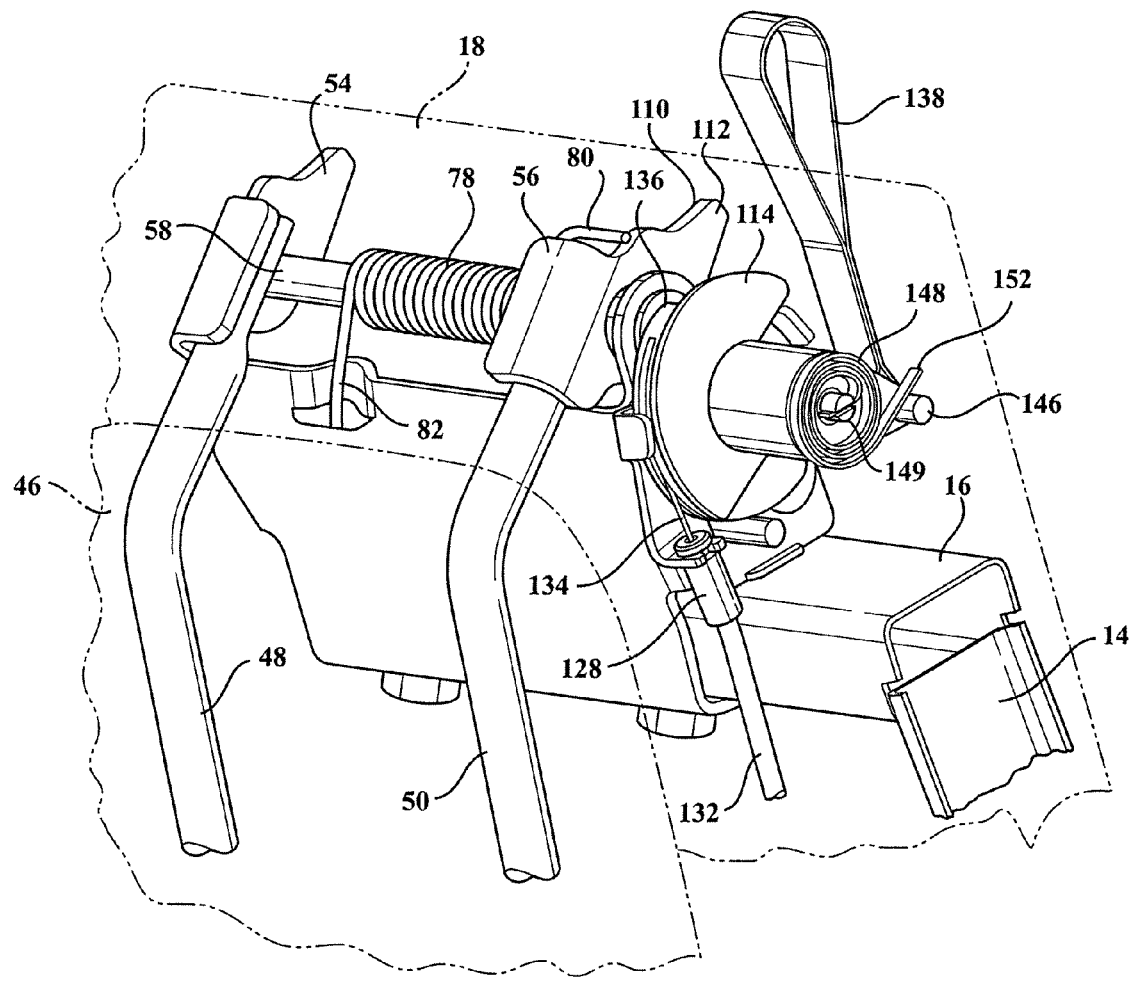
FIG. 6 succeeds FIG. 5 and depicts a forwardly most rotated and dump position established by the forward pivoting seatback.

FIG. 5 is a further succeeding view of FIG. 4 depicting the headrest in a fully forward rotated and dumped position at an intermediate position established by the forward pivoting seatback, this protocol again dictated by the translation of the inner wire 134 of the cable secured to the remote seatback location. FIG. 6 succeeds FIG. 5 and depicts a forward most rotated and dump position established by the forward pivoting seatback.

Figure 7:
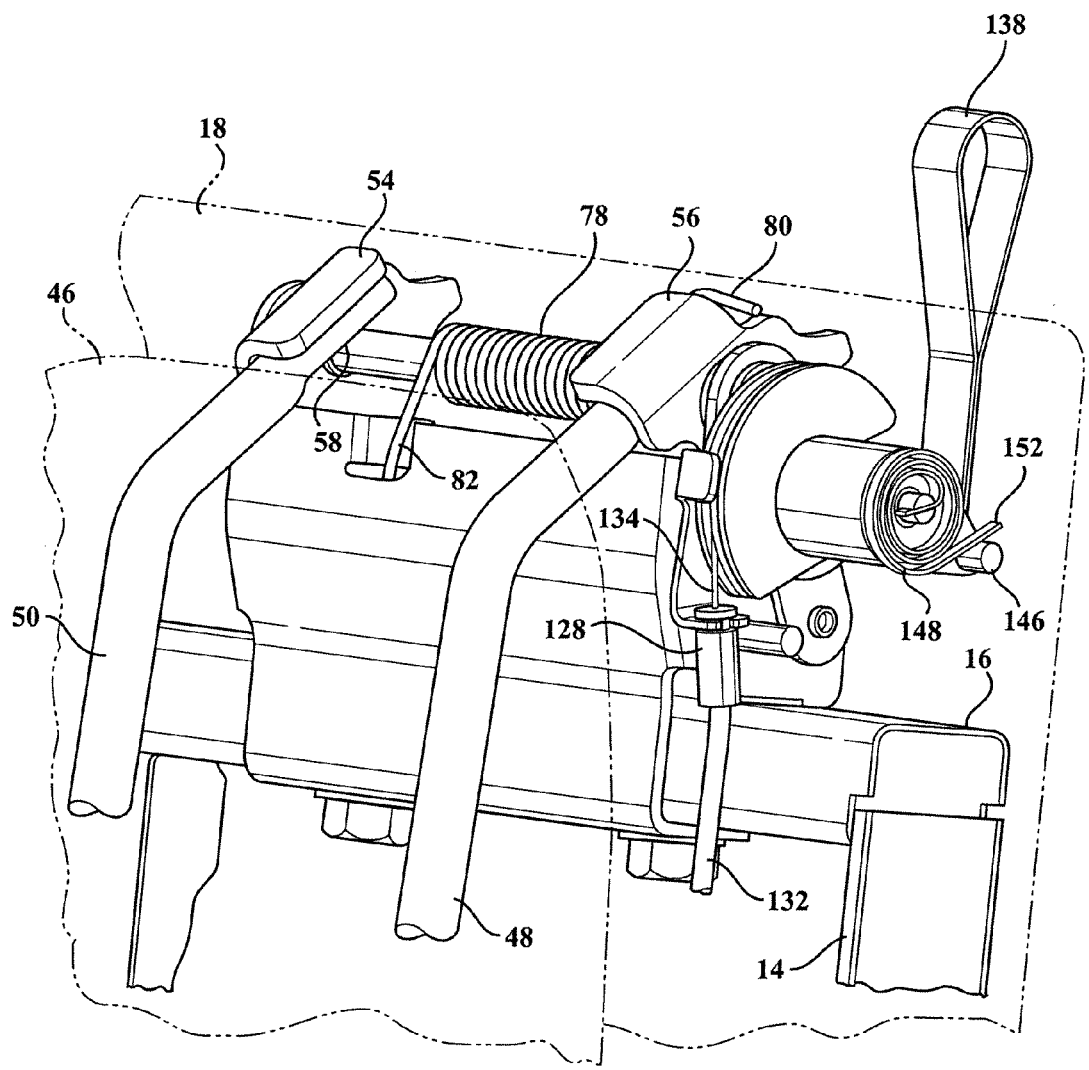
FIG. 7 is an upright reset position of the seatback similar to as shown in FIG. 1, with the headrest remaining in the forward rotated dump position.
Figure 8:
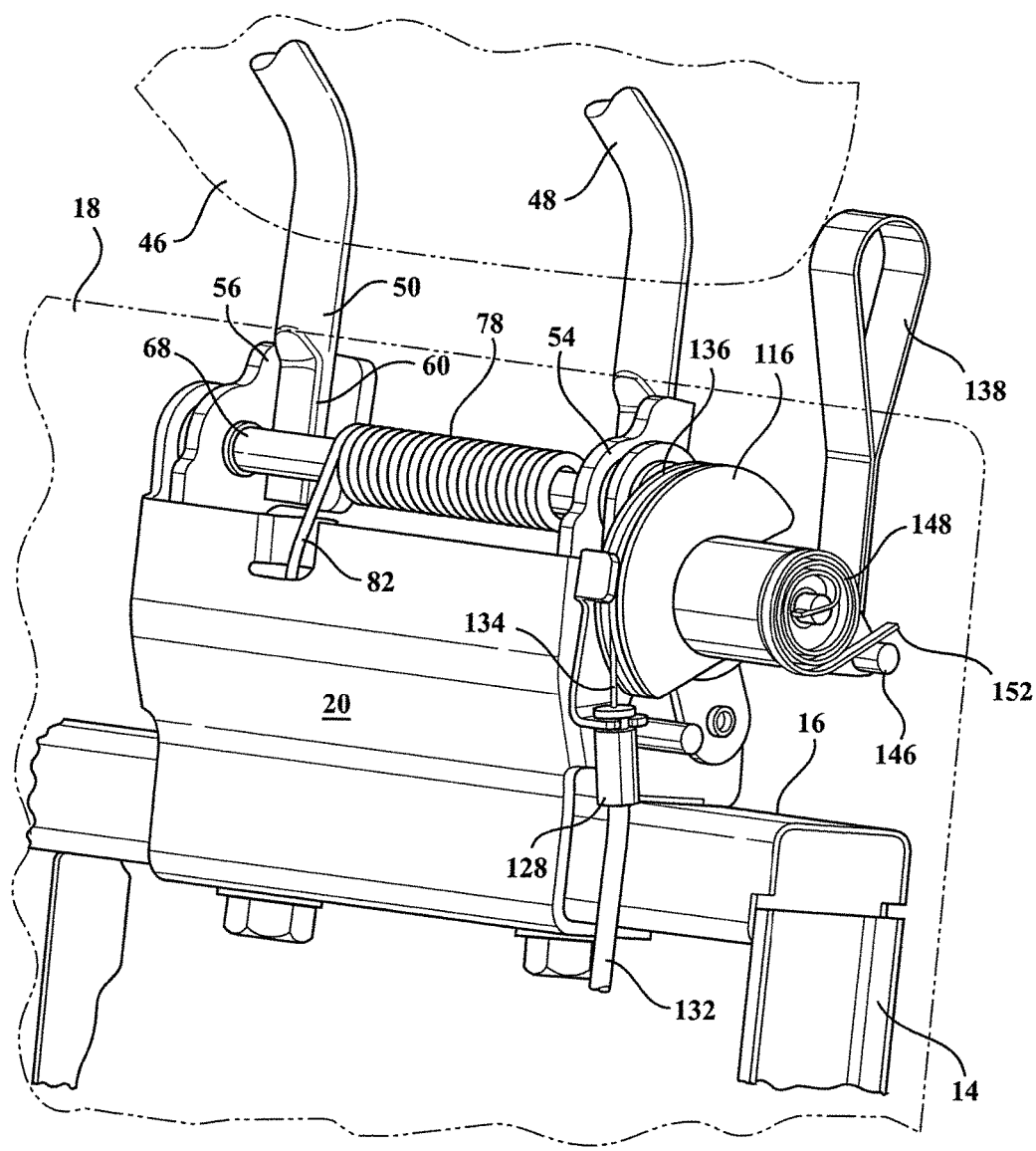
FIG. 8 is an intermediate and upright design reset position of the headrest, such as resulting from manual and counter-biasing rotation by the user, and prior to upright resetting of the cam and laterally projecting pin.
Figure 9:
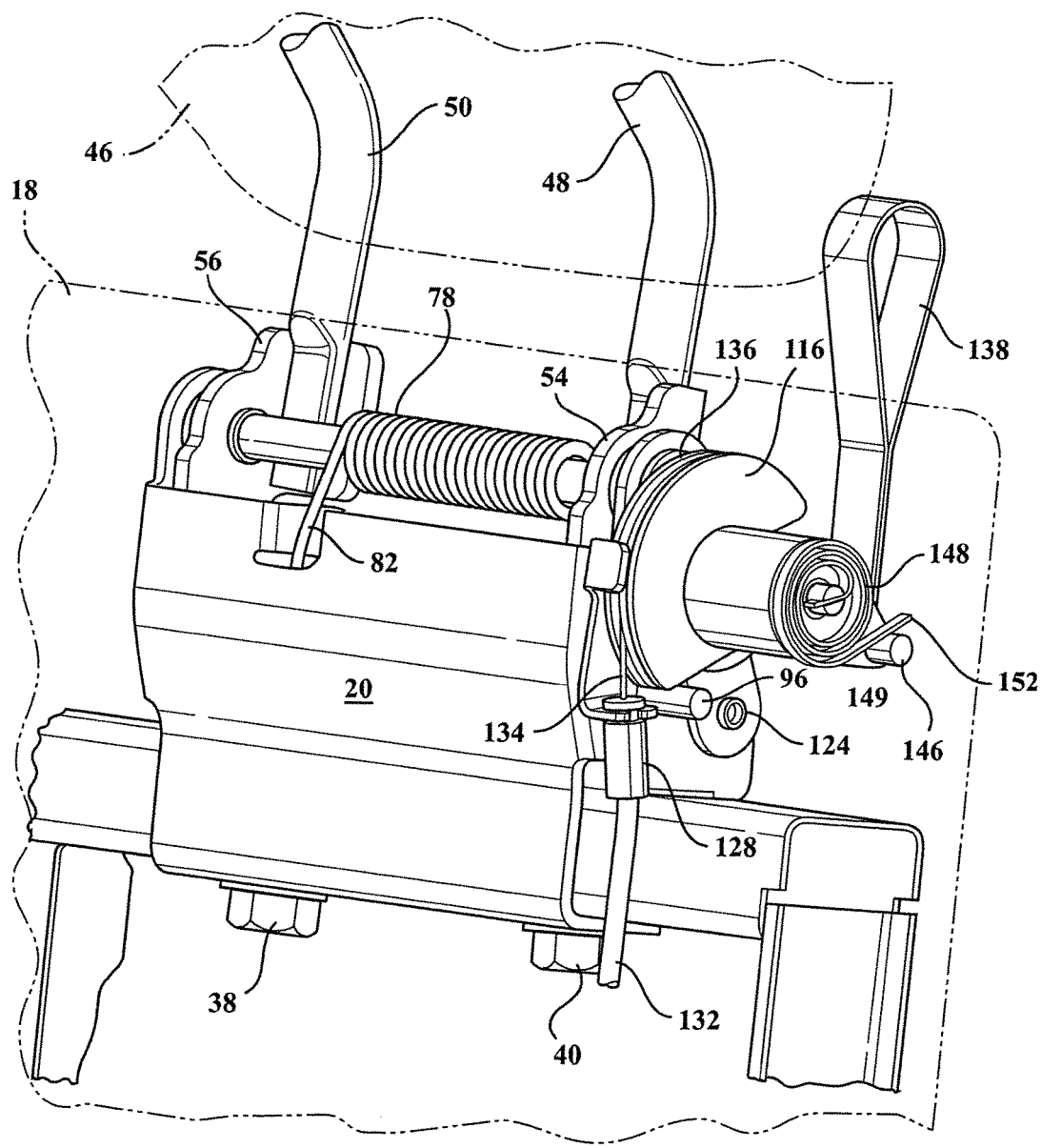
FIG. 9 succeeds FIG. 8 and depicts the cam and laterally projecting pin in the upright reset location in the original upright design position also in FIG. 1.

Proceeding to FIG. 7, an upright reset position of the seatback is shown similar to as previously depicted in FIG. 1, with the headrest remaining in the forward rotated dump position. FIG. 8 is an intermediate and upright design reset position of the headrest, such as resulting from manual and counter-biasing (upward) forced rotation of the headrest bun 46 by the user, and prior to upright resetting of the cam 88 and laterally projecting pin 96 into upward spring loaded engagement with the top arcuate end of the interior channel 100 in the side flange 26. FIG. 9 succeeds FIG. 8 and depicts the cam 88 and laterally projecting pin 96 in the upright reset location as also depicted in the original upright design position in FIG. 1.

Figure 10:
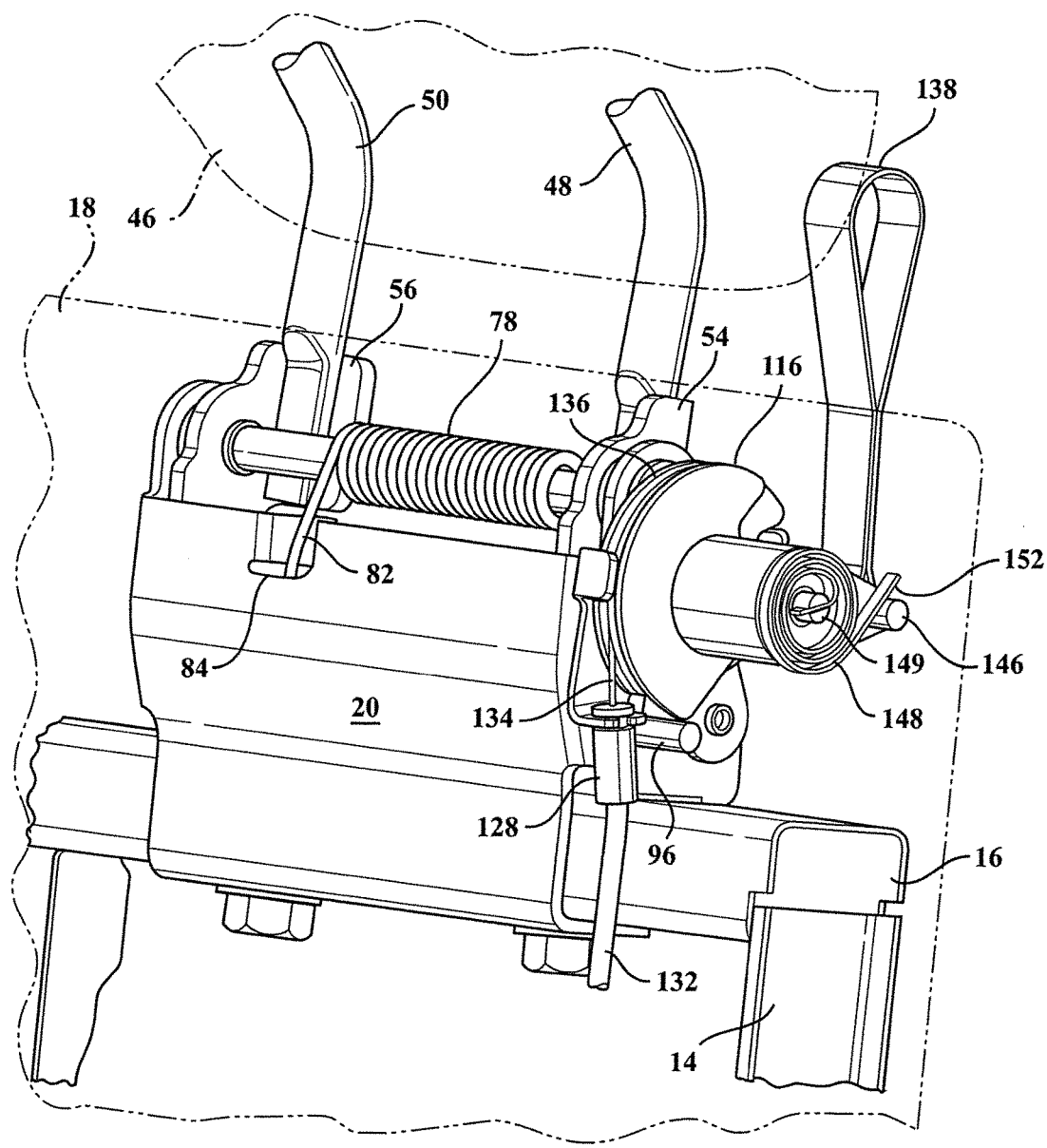
FIG. 10 is an illustration of the headrest assembly in the upright design position and illustrating the initiation of a second release protocol in which pin engaging rotation is initiated in a secondary wheel coaxially supported in independently rotating fashion against an exterior surface of the cable supported first wheel, upon localized displacement of a pull strap extending from an offset location of the secondary wheel.

Proceeding to FIG. 10, an illustration is shown of the headrest assembly in the upright design position at the initiation of a second release protocol in which the pin 96 is engaging by the circumferential ledge 158 associated with the secondary wheel 116 (see also FIG. 3), again coaxially supported in independently rotating fashion against an exterior surface of the cable supported first wheel 114. Upon localized displacement of the pull strap 138, in a counter clockwise direction (arrow 160 in FIG. 11) extending from an offset location of the secondary wheel in a second release protocol, the headrest tubes and bun are dumped (this again defined by the forward edges of the sector brackets 54 and 56 abutting the top horizontal edge of the bracket mount as best shown in each of FIGS. 7, 11 and 12).

Figure 11:
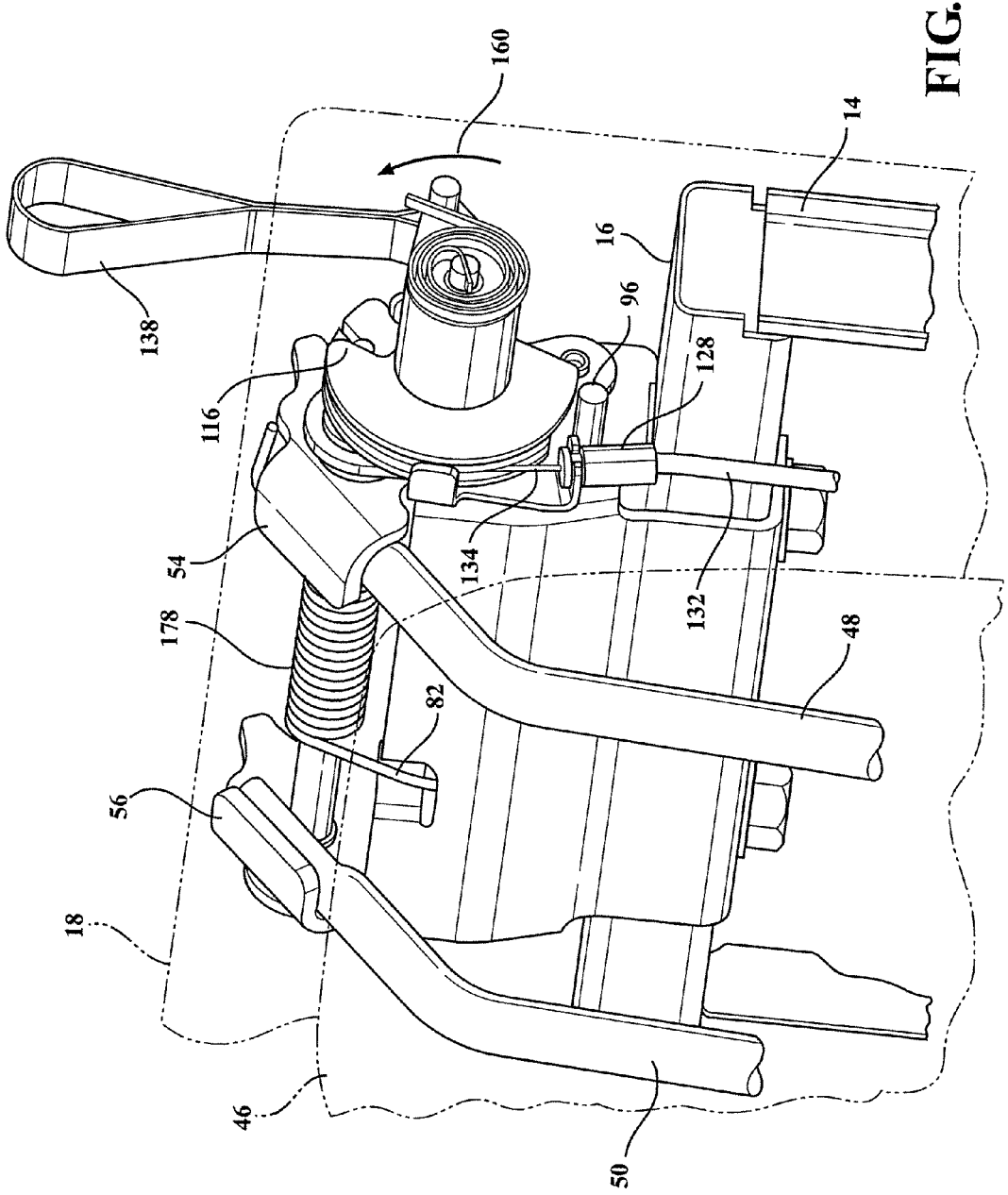
FIG. 11 succeeds FIG. 10 and, in response to a similar perimeter edge configured portion of the secondary wheel rotating into abutting and downwardly pivoting contact with the cam pin (in response to continued displacement of the strap and independently of the motion of the first cable supported wheel), again causing downward pivotal unseating of the cam from the engaging location of width supporting bracket associated with the headrest rods, thereby achieving the forward dump position of the headrest as also shown in FIGS. 5-7, such occurring with the seatback remaining in the upright design position.

As previously explained, FIG. 11 succeeds FIG. 10 and, in response to a similar perimeter edge configured portion of the secondary wheel rotating into abutting and downwardly pivoting contact with the cam pin (in response to continued displacement of the strap and independently of the motion of the first cable supported wheel), again causing downward pivotal unseating of the cam from the engaging location of width supporting bracket associated with the headrest rods, thereby achieving the forward dump position of the headrest as also shown in FIGS. 5-7, such occurring with the seatback remaining in the upright design position and due to the first wheel 114 remaining static due to no pulling force exerted by the cable.

Figure 12:
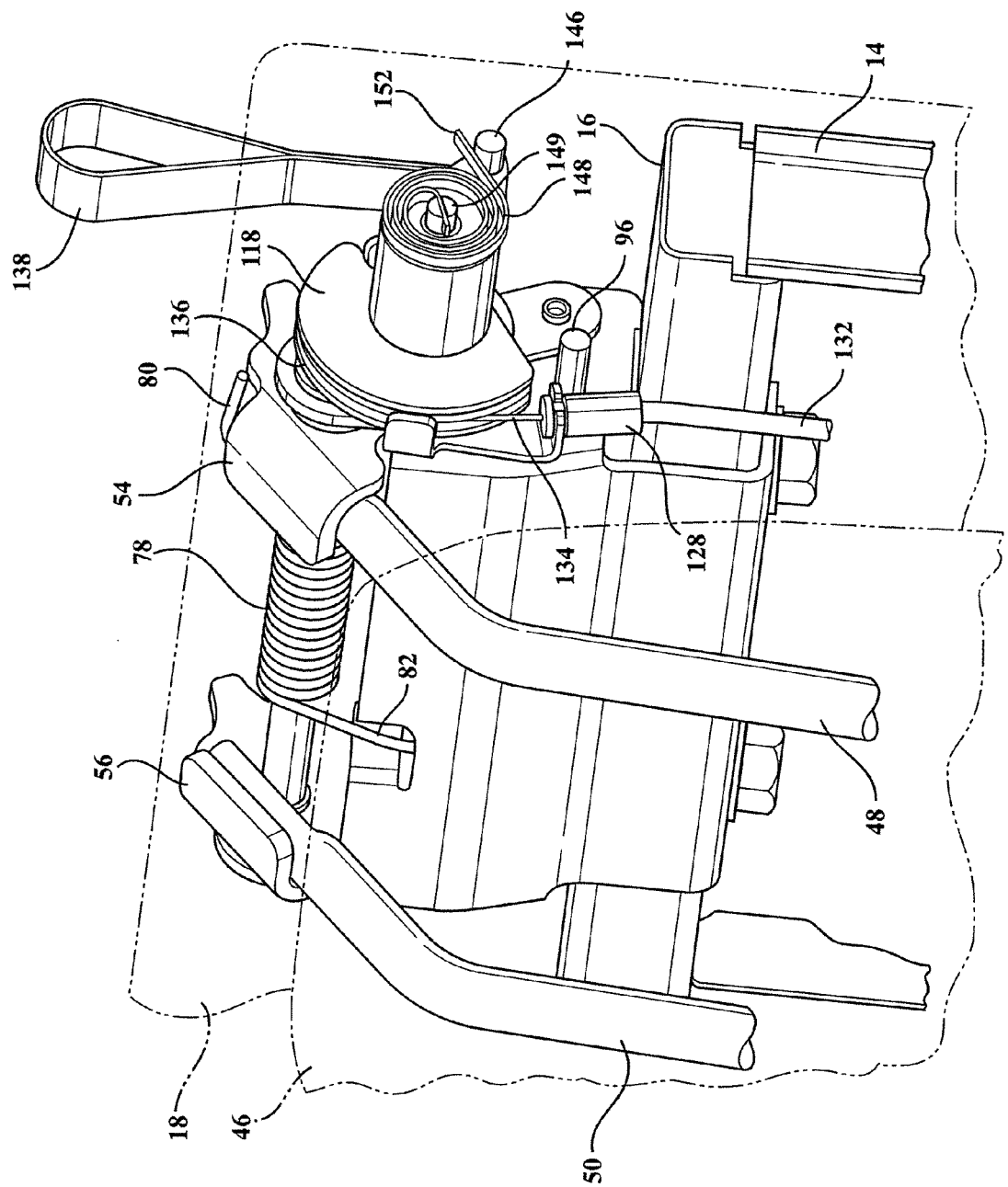
FIG. 12 succeeds FIG. 11 and illustrates subsequent release of the pull strap, with the secondary wheel rotating by its spring bias in reverse direction out of engagement with the cam pin, which remains in the downwardly pivoted and held position.
Figure 13:
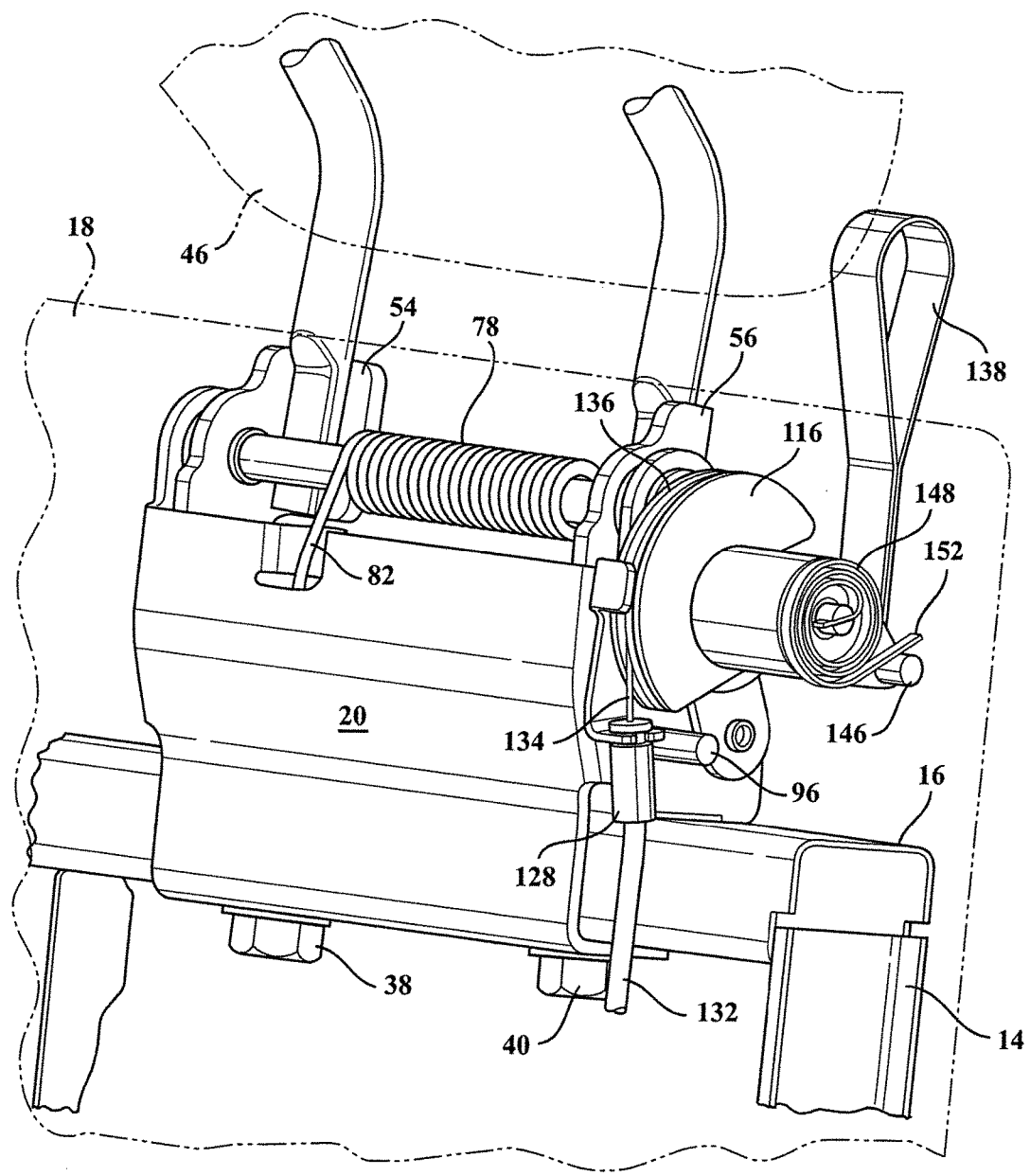
FIG. 13 illustrates a manual upright reset of the headrest similar to that shown in FIG. 8, again such as resulting from manual and counter-biasing rotation by the user, and prior to upright resetting of the cam and laterally projecting pin.

FIG. 12 succeeds FIG. 11 and illustrates subsequent release of the pull strap (see return arrow 154 in FIG. 1), the secondary wheel 116 rotating by its spring bias 148 in reverse direction out of engagement with the pin 96 of cam 88. As further shown in the manual upright reset position of FIG. 13, the cam remains in the downwardly pivoted and held position in which the pin 96 seats against the bottom end of the arcuate channel 100 in the side flange 26, this until such time as the headrest has fully been rotated to the upright design (reset) position, at which point the underside projection is rotated across the upper surface of the cam 88 and clears the forward edge 108 thereof, allowing the cam 88 to pivot back up due to its spring bias 102 into contact with the abutting location 110 defined on the lower inside of the underside headrest projection 112 (again best shown in FIG. 2).

Having described our invention, other and additional preferred embodiments will become apparent to those skilled in the art to which it pertains, and without deviating from the scope of the appended claims.

The invention claimed is:

1. A headrest assembly, comprising:
   a bracket mount affixed to an upper portion of a seatback frame;
   a pair of headrest bun supporting tubes pivotally secured to said bracket mount;
   a spring biased cam pivotally secured to said bracket mount and, in a normally biased position, engaging an underside projection of a selected one of said supporting tubes, said cam having an outwardly projecting pin; and
   at least one rotatable component rotatably mounted to an exterior of said bracket mount in proximity to said cam, said rotatable component having an outer circumferential location which, upon being rotated, contacting said projecting pin causing said cam to pivot in a downward unseating direction from said supporting tube, triggering release of said headrest and supporting tubes in a forwardly rotating and dump position.

2. The headrest assembly as described in claim 1, wherein said bracket mount further comprising a multi-sided construction including a substantially planar surface, a bottom flange and a pair of side flanges.

3. The headrest assembly as described in claim 2, further comprising a thin strip shaped and width extending plate seating against underside ledge surfaces of said side flanges and so that said bracket mount is affixed to a generally central location of a seatback upper cross extending frame member, said plate overlaying a top surface of said cross member, said bottom flange overlapping a bottom surface of said cross member, a pair of fasteners engaging through said bottom flange, cross member and top surface.

4. The headrest assembly as described in claim 2, further comprising a bracket sector mounted to a bottom end location of each of said headrest bun supporting tubes, each of said bracket sectors exhibiting a pseudo planar and curved profile for capturing said bottom inserting ends of said headrest tubes, a main pivot pin seating through apertures in said bracket sectors in alignment with apertures formed through said side flanges of said bracket mount.

5. The headrest assembly as described in claim 4, wherein a main pivot torsion spring extending between said bracket sectors and through a widthwise interior of which is seated said main pivot pin, a first end of said spring engaging an underside edge of a selected one of said pivotally supported bracket sectors, an opposite second end of said main spring biasing against a supporting location of said bracket mount.

6. The headrest assembly as described in claim 2, said spring biased cam further comprising a lower end defined aperture, through which is inserted from an inside direction a cam pivot pin, said cam aligning against an inside surface of a selected one of said side flanges of said bracket mount and so that said pivot pin inserts through said cam aperture and an aligning aperture in said selected side flange.

7. The headrest assembly as described in claim 6, wherein said cam further comprising an outwardly projecting pin extending from an intermediate location thereof and through an arcuate channel defined in said selected side flange in order to define a pivotal range of cam displacement.

8. The headrest assembly as described in claim 7, further comprising a cam torsion spring seating over an inner projecting portion of said cam pivot pin and including an outer angled end which biases against an underside location of said cam, an opposite inner spring end of said cam torsion spring being curled inwardly in order to seat within a diameter extending recessed surface established within the inner end of said pivot pin so that said cam torsion spring influences said cam in an upwardly biased fashion such that a forward contoured edge of said cam abuts an inside location defined along an underside projecting portion of said selected bracket sector.

9. The headrest assembly as described in claim 1, wherein said at least one rotatable component further comprising a pair of independently rotatable and coaxially supported wheel shaped components provided upon an exterior surface of said selected side flange, each of said first and second independently rotatable wheels having a central aperture which mounts a pin, in turn seating through a further aperture defined in said selected side flange of said bracket mount, each of said wheels further having a an outer circumferential profile exhibiting a protrusion, said outwardly projecting pin portion of said cam extends an adequate distance through said arcuate channel defined in said selected side flange such that can be alternatively engaged and downwardly pivoted by either of the circumferential located protrusions.

10. The headrest assembly as described in claim 9, wherein a first of said pair of wheel shaped components further comprising a cable actuated wheel having an outer circumferential extending recess defined therein, a cable release torsion spring and associated cable bracket being secured to an exterior surface of said selected side flange and engaged by said wheel mounting pin extending through an aligning aperture defined in said cable bracket.

11. The headrest assembly as described in claim 10, further comprising a cable mount affixed to a location of said cable bracket, an outer sheath of said cable extending from said cable mount to a remote location of the seatback, an inner translating wire projecting from said fixed cable mount and being looped about and secured to said circumferential recess defined in said first wheel such that rotation of said headrest is triggered in response to forward rotating motion of the seatback about a lower pivot location.

12. The headrest assembly as described in claim 9, further comprising a further torsional spring applied against an exterior surface of a second of said wheel shaped components, an inner curled end of said further torsional spring securing over a notched outer end of said wheel mounting pin, an opposite outer extending end of said further torsional spring abutting against a projecting end location of said stem associated with said pin, biasing said second wheel in a selected rotational direction.

13. The headrest assembly as described in claim 12, further comprising a pull strap secured between a pair of spaced apart projections forming a portion of a housing associated with said second wheel, a pin seating through end proximate and aligning apertures in said projections, as well as passing through the inner looped end of said strap in order to secure said strap to a rotationally offset location of said second wheel relative to a central coaxial axis defined by said wheel mounting pin.

14. A headrest assembly, comprising:
a bracket mount affixed to n upper portion of a seatback frame;
a pair of headrest bun supporting tubes pivotally secured to said bracket mount;
a spring biased cam pivotally secured to said bracket mount and, in a normally biased position, engaging an underside projection of a selected one of said supporting tubes, said cam having an outwardly projecting pin;
at least one rotatable component rotatably mounted to an exterior of said bracket mount in proximity to said cam, said rotatable component having an outer circumferential location which, upon being rotated, contacting said projecting pin causing said cam to pivot in a downward unseating direction from said supporting tube, triggering release of said headrest and supporting tubes in a forwardly rotating and dump position; and
said at least one rotatable component further including a pair of independently rotatable and coaxially supported wheel shaped components provided upon an exterior surface of said selected side flange, each of said first and second independently rotatable wheels having a central aperture which mounts a pin, in turn seating through a further aperture defined in said selected side flange of said bracket mount, each of said wheels further having a an outer circumferential profile exhibiting a protrusion, said outwardly projecting pin portion of said earn extends an adequate distance through said arcuate channel defined in said selected side flange such that can be alternatively engaged and downwardly pivoted by either of the circumferential located protrusions.

15. The headrest assembly as described in claim 14, wherein a first of said pair of wheel shaped components further comprising a cable actuated wheel having an outer circumferential extending recess defined therein, a cable release torsion spring and associated cable bracket being secured to an exterior surface of said selected side flange and engaged by said wheel mounting pin extending through an aligning aperture defined in said cable bracket.

16. The headrest assembly as described in claim 15, further comprising a cable mount affixed to a location of said cable bracket, an outer sheath of said cable extending from said cable mount to a remote location of the seatback, an inner translating wire projecting from said fixed cable mount and being looped about and secured to said circumferential recess defined in said first wheel such that rotation of said headrest is triggered in response to forward rotating motion of the seatback about a lower pivot location.

17. The headrest assembly as described in claim 15, further comprising a further torsional spring applied against an exterior surface of a second of said wheel shaped components, an inner curled end of said further torsional spring securing over a notched outer end of said wheel mounting pin, an opposite outer extending end of said further torsional spring abutting against a projecting end location of said stem associated with said pin, biasing said second wheel in a selected rotational direction.

18. The headrest assembly as described in claim 17, further comprising a pull strap secured between a pair of spaced apart projections forming a portion of a housing associated with said second wheel, a pin seating through end proximate and aligning apertures in said projections, as well as passing through the inner looped end of said strap in order to secure said strap to a rotationally offset location of said second wheel relative to a central coaxial axis defined by said wheel mounting pin.

19. A headrest assembly, comprising:
a bracket mount affixed to an upper portion of a seatback frame, said bracket mount further including a multi-sided construction including a substantially planar surface, a bottom flange and a pair of side flanges;
a pair of headrest bun supporting tubes pivotally secured to said bracket mount;
a spring biased cam pivotally secured to said bracket mount and, in a normally biased position, engaging an underside projection of a selected one of said supporting tubes, said cam having an outwardly projecting pin;
said spring biased cam further including a lower end defined aperture, through which is inserted from an inside direction a cam pivot pin, said cam aligning against an inside surface of a selected one of said side flanges of said bracket mount and so that said pivot pin inserts through said cam aperture and an aligning aperture in said selected side flange; and
at least one rotatable component rotatably mounted to an exterior of said bracket mount in proximity to said cam, said rotatable component having an outer circumferential location which, upon being rotated, contacting said projecting pin causing said cam to pivot in a downward unseating direction from said supporting tube, triggering release of said headrest and supporting tubes in a forwardly rotating and dump position.

20. The headrest assembly as described in claim 19, wherein said at least one rotatable component further comprising a pair of independently rotatable and coaxially supported wheel shaped components provided upon an exterior surface of said selected side flange, each of said first and second independently rotatable wheels having a central aperture which mounts a pin, in turn seating through a further aperture defined in said selected side flange of said bracket mount, each of said wheels further having a an outer circumferential profile exhibiting a protrusion, said outwardly projecting pin portion of said cam extends an adequate distance through said arcuate channel defined in said selected side flange such that can be alternatively engaged and downwardly pivoted by either of the circumferential located protrusions.

\* \* \* \* \*